United States Patent
Fu et al.

(10) Patent No.: US 10,542,254 B2
(45) Date of Patent: Jan. 21, 2020

(54) VIDEO BIT RATE CONTROL METHOD AND VIDEO CODING DEVICE

(71) Applicant: HANGZHOU HIKVISION DIGITAL TECHNOLOGY CO., LTD, Hangzhou, Zhejiang (CN)

(72) Inventors: Tao Fu, Hangzhou (CN); Shiliang Pu, Hangzhou (CN); Hai Yu, Hangzhou (CN); Linjie Shen, Hangzhou (CN)

(73) Assignee: HANGZHOU HIKVISION DIGITAL TECHNOLOGY CO., LTD, Hangzhou, Zhejiang (CN)

( * ) Notice: Subject to any disclaimer, the term of this patent is extended or adjusted under 35 U.S.C. 154(b) by 17 days.

(21) Appl. No.: 15/742,385

(22) PCT Filed: Aug. 11, 2015

(86) PCT No.: PCT/CN2015/086688
§ 371 (c)(1),
(2) Date: Jan. 5, 2018

(87) PCT Pub. No.: WO2017/004863
PCT Pub. Date: Jan. 12, 2017

(65) Prior Publication Data
US 2018/0192049 A1     Jul. 5, 2018

(30) Foreign Application Priority Data
Jul. 7, 2015 (CN) .......................... 2015 1 0401526

(51) Int. Cl.
*H04N 19/00* (2014.01)
*H04N 19/115* (2014.01)
(Continued)

(52) U.S. Cl.
CPC ......... *H04N 19/115* (2014.11); *H04N 19/124* (2014.11); *H04N 19/146* (2014.11)

(58) Field of Classification Search
CPC ... H04N 19/146; H04N 19/124; H04N 19/115
See application file for complete search history.

(56) References Cited

U.S. PATENT DOCUMENTS

| | | | | |
|---|---|---|---|---|
| 5,623,424 A | * | 4/1997 | Azadegan | G11B 27/031 375/E7.088 |
| 2003/0152151 A1 | | 8/2003 | Hsieh et al. | |

(Continued)

FOREIGN PATENT DOCUMENTS

| | | |
|---|---|---|
| CN | 101127909 A | 2/2008 |
| CN | 101202912 A | 6/2008 |

(Continued)

OTHER PUBLICATIONS

PCT International Search Report for PCT Patent Application No. PCT/CN2015/086688 dated Apr. 7, 2016. 4 pages.

(Continued)

*Primary Examiner* — Zhihan Zhou
(74) *Attorney, Agent, or Firm* — McAndrews, Held & Malloy, Ltd.

(57) ABSTRACT

The disclosure discloses a video bit rate control method and a video coding device. The method includes: according to a pre-set first bit rate value and a code size generated in a previous period of time, a first quantization parameter is generated (S1); according to a pre-set second bit rate value and the code size generated in the previous period of time, a second quantization parameter is generated (S2); the first quantization parameter is composed with the second quantization parameter (S3); if the first quantization parameter is greater than or equal to the second quantization parameter, an image frame in a current period of time is coded by using the first quantization parameter (S4); and if the first quantization parameter is less than the second quantization (Continued)

parameter, the image frame in the current period of time is coded by using the second quantization parameter (S5).

18 Claims, 8 Drawing Sheets

(51) Int. Cl.
*H04N 19/146* (2014.01)
*H04N 19/124* (2014.01)

(56) References Cited

U.S. PATENT DOCUMENTS

| | | | |
|---|---|---|---|
| 2004/0156550 A1* | 8/2004 | Govindaswamy | ............................ H04N 7/17318 382/239 |
| 2006/0159169 A1* | 7/2006 | Hui | ...................... H04N 19/176 375/240.03 |
| 2008/0225953 A1* | 9/2008 | Ratakonda | ....... H04N 21/23439 375/240.21 |
| 2011/0032999 A1* | 2/2011 | Chen | .............. H04N 21/234327 375/240.26 |
| 2011/0142125 A1* | 6/2011 | Tripathi | ................ H04N 19/149 375/240.03 |
| 2013/0142249 A1* | 6/2013 | Chaurasia | ............ H04N 19/176 375/240.03 |
| 2013/0243409 A1* | 9/2013 | Esumi | .................... H04N 5/765 386/355 |

FOREIGN PATENT DOCUMENTS

| | | |
|---|---|---|
| CN | 102104778 A | 6/2011 |
| CN | 104159109 A | 11/2014 |

OTHER PUBLICATIONS

Extended European Search Report, dated Dec. 5, 2018 for EP Application No. 15897519.3.

\* cited by examiner

| The first bit rate value | | | | | |
|---|---|---|---|---|---|
| The first average bit rate of the first time subinterval | The first average bit rate of the second time subinterval | The first average bit rate of the third time subinterval | ... | The first average bit rate of the (N-1)th time subinterval | The first average bit rate of the Nth time subinterval |

VIDEO BIT RATE CONTROL METHOD AND VIDEO CODING DEVICE

CROSS-REFERENCE TO RELATED APPLICATIONS/INCORPORATION BY REFERENCE

This application is a 371 of International Patent Application No. PCT/CN2015/086688, filed Aug. 11, 2015, entitled "VIDEO BIT RATE CONTROL METHOD AND VIDEO CODING DEVICE," which claims priority to Chinese patent application No. 201510401526.5, filed Jul. 7, 2015, entitled "VIDEO CODE RATE CONTROL METHOD AND VIDEO ENCODING APPARATUS". The above-identified applications are hereby incorporated herein by reference in their entirety.

FIELD

The disclosure belongs to the field of video compression technology, and in particular to a video bit rate control method and a video coding device.

BACKGROUND

The output bit rate of video coding is tied to image contents, coding modes, quantization parameters, and so on. Generally, the output bit rate of video coding constantly changes. Transmission bandwidth and storage capacity are known, but the output bit rate of video coding constantly changes, so the contradiction requires bit rate control for regulation.

There are generally two bit rate control methods: a Constant Bit Rate (CBR) control method and a Variable Bit Rate (VBR) control method. The CBR serves the stability of bit rate, and the VBR serves the stability of bit rate quality. When the above two bit rate control methods set the bit rate, 1. the CBR is usually used for setting an average value of the bit rate; and
2. the VBR is usually used for setting an upper limit value of the bit rate.

In the practical application process, both the two bit rate methods have some problems.

1. When the average value of the bit rate is set using the CBR, from long time, different time intervals have different requirements on the bit rate. For example, generally the requirement on the bit rate during the day is higher than that at night; at this time, setting the average bit rate value high will cause wastes, but setting it low will influence the video quality of some time intervals.

2. When the upper limit value of the bit rate is set using the VBR, the VBR control method does not cause the waste of bit rate while guaranteeing the overall video quality. However, the specific storage capacity cannot be previously estimated; when a storage space is configured, it is always configured according to the upper limit value of bit rate, which increases the cost.

The actual transmission bandwidth and storage capacity are limited, but both the existing two bit rate control methods and a bit rate setting method cannot balance the relation between the video quality and the target bit rate.

SUMMARY OF THE INVENTION

The disclosure is intended to provide a video bit rate control method and a video coding device, which can realize long-time (for example, 24 hours) bit rate control, and can guarantee the stability of video quality to the greatest extent.

To this end, an aspect of the disclosure provides a video bit rate control method for controlling the bit rate of video bit streams within a periodical time interval, which includes the following steps: according to a pre-set first bit rate value and a code size generated in a previous period of time, a first quantization parameter is generated; according to a pre-set second bit rate value and the code size generated in the previous period of time, a second quantization parameter is generated; the first quantization parameter is composed with the second quantization parameter; if the first quantization parameter is greater than or equal to the second quantization parameter, an image frame in a current period of time is coded by using the first quantization parameter; and if the first quantization parameter is less than the second quantization parameter, the image frame in the current period of time is coded by using the second quantization parameter.

The step of according to the pre-set first bit rate value and the code size generated in the previous period of time, generating the first quantization parameter includes that: the periodical time interval is divided into N time subintervals, wherein N is greater than 1; initial allocation is performed to each time subinterval, so as to obtain a first average bit rate of each time subinterval, and make the first average bit rate satisfy the following formula:

$$\frac{\sum_{n=1}^{N} \text{the first average code rate of the } n\text{th time sub interval}}{N} =$$

the first code rate value;

bit rate adjustment is performed to the first average bit rate of each time subinterval, so as to obtain a second average bit rate of each time subinterval, and make the second average bit rate satisfy the following formula:

$$\frac{\sum_{n=1}^{N} \text{the second average code rate of the } n\text{th time sub interval}}{N} =$$

the first code rate value.

According to the pre-set first bit rate value and the code size generated in the previous period of time, the first quantization parameter is generated.

The step of performing initial allocation includes that: according to pre-set prior information, initial allocation is performed to the average bit rate of each time subinterval; or the first average bit rate of each time subinterval is allocated to be the same as the first bit rate value.

The step of performing bit rate adjustment includes that: an average bit rate that actually generates in the corresponding time subinterval of the previous time interval is obtained, so as to regard it as a third average bit rate; a difference value between the second average bit rate of each time subinterval and the third average bit rate corresponding to the time subinterval is calculated; after the end of each time subinterval, bit rate adjustment is performed according to the difference value of each time subinterval; and/or after the end of all the N time subintervals, bit rate adjustment is performed according to the difference values of all the time subintervals.

The step of performing bit rate adjustment according to the difference value of each time subinterval after the end of each time subinterval includes that: the difference value of the current time subinterval is divided by N to obtain a first average difference value; and the first average difference value is overlaid on the second average bit rate of each time subinterval in the N time subintervals after the time subinterval.

The step of performing bit rate allocation according to the difference values of all the time subintervals after the end of all the N time subintervals includes that: for each positive difference value time subinterval when the difference value is positive, at least a part of the difference value is put into a saving pool; and for each negative difference value time subinterval when the difference value is negative, the total bit rate value of the saving pool is allocated to each negative difference value time subinterval.

The step of putting at least a part of the difference value into the saving pool includes that: the second average bit rate of the positive difference value time subinterval is reallocated, so as to reduce the second average bit rate of positive difference value time subinterval by at least a part of the difference value; and the current value of the saving pool is increased by at least a part of the difference value.

The step of allocating the total bit rate value of the saving pool to each negative difference value time subinterval includes that: the total bit rate value of the saving pool is equally allocated to each negative difference value time subinterval; or according to a difference value ratio, the total bit rate value of the saving pool is allocated to each negative difference value time subinterval.

The step of equally allocating the total bit rate value of the saving pool to each negative difference value time subinterval includes that: the total bit rate value of the saving pool is divided by the number of the negative difference value time subintervals, so as to obtain a second average difference value; and the second average difference value is overlaid on the second average bit rate of each negative difference value time subinterval.

The step of allocating the total bit rate value of the saving pool to each negative difference value time subinterval according to the difference value ratio includes that: the difference value ratio of the difference value of each negative difference value time subinterval to the total difference value of all the negative difference value time subintervals is calculated; the total bit rate value of the saving pool is multiplied by the difference value ratio of each negative difference value time subinterval, so as to obtain a saved bit rate allocation value of each negative difference value time subinterval; and each saved bit rate allocation value is respectively overlaid on the second average bit rate of its corresponding time subinterval.

The first bit rate value is a predetermined target average bit rate, which is a fixed value in each periodical time interval; and the second bit rate value is a predetermined upper limit value of bit rate. Before the step of calculating the second quantization parameter, the method further includes that: when a transmission bandwidth constraint is not detected, performing the step of coding the image frame by using the second quantization parameter is stopped.

Another aspect of the disclosure provides a video coding device for controlling the bit rate of video bit streams within a periodical time interval to perform video coding; the device includes: an image sensor, configured to obtain image information and generate video bit streams, and output the video bit streams to a first bit rate controller and a second bit rate controller; the first bit rate controller, configured to generate the first quantization parameter according to the pre-set first bit rate value, and output the first quantization parameter to an coder; the second bit rate controller, configured to generate the second quantization parameter according to the pre-set second bit rate value, and output the second quantization parameter to the coder; and the coder, configured to code the image frame of the current period of time according to the greater one in the first quantization parameter and the second quantization parameter.

The first bit rate controller is further configured to receive from the coder the code size generated in the previous period of time, and calculate according to the first bit rate value and the code size of the previous period of time to obtain the first quantization parameter; and the second bit rate controller is further configured to receive from the coder the code size generated in the previous period of time, and calculate according to the second bit rate value and the code size of the previous period of time to obtain the second quantization parameter.

The first bit rate controller divides the periodical time interval into N time subintervals, wherein N is greater than 1; the device further includes: an initial bit rate allocation unit, configured to perform initial allocation to each time subinterval, so as to obtain the first average bit rate of each time subinterval, and make the first average bit rate satisfy the following formula:

$$\frac{\sum_{n=1}^{N} \text{the first average code rate of the } nth \text{ time sub interval}}{N} =$$

the first code rate value;

and a bit rate adjustment unit (22), configured to perform bit rate adjustment to the first average bit rate of each time subinterval, so as to obtain the second average bit rate of each time subinterval, and make the second average bit rate satisfy the following formula:

$$\frac{\sum_{n=1}^{N} \text{the second average code rate of the } nth \text{ time sub interval}}{N} =$$

the first code rate value.

The initial bit rate allocation unit includes: a first initial allocation unit, configured to perform initial allocation to the average bit rate of each time subinterval according to the pre-set prior information; and/or a second initial allocation unit, configured to allocate the first average bit rate of each time subinterval to be the same as the first bit rate value.

The first bit rate controller further includes a bit rate obtaining unit, configured to obtain the average bit rate that actually generates in the corresponding time subinterval of the previous time interval, so as to regard it as the third average bit rate;

the bit rate adjustment unit further includes a difference value calculating unit, configured to calculate the difference value between the second average bit rate of each time subinterval and the third average bit rate corresponding to the time subinterval.

The bit rate adjustment unit includes: a first adjustment subunit, configured to, after the end of each time subinterval, perform bit rate allocation according to the difference value of each time subinterval; and/or a second adjustment subunit, configured to, after the end of all the N time subintervals, perform bit rate allocation according to the difference values of all the time subintervals.

The first adjustment subunit performs bit rate allocation in the following way: dividing the difference value of the current time subinterval by N to obtain the first average difference value; and overlaying the first average difference value on the second average bit rate of each time subinterval in the N time subintervals after the time subinterval.

The second adjustment subunit further includes: a storage, configured to store the saved bit rate value; a first difference value allocation unit, configured to, for each positive difference value time subinterval when the difference value is positive, store at least a part of the difference value into the storage; and the second adjustment subunit, configured to, for each negative difference value time subinterval when the difference value is negative, allocate the total saved bit rate value of the storage to each negative difference value time subinterval.

The second adjustment subunit reallocates the second average bit rate of the positive difference value time subinterval, so as to reduce the second average bit rate of positive difference value time subinterval by at least a part of the difference value; and the first difference value allocation unit increases the current value of the storage by at least a part of the difference value.

The second adjustment subunit allocates the total saved bit rate value in the storage to each negative difference value time subinterval in the following way: dividing the total bit rate value of the saving pool by the number of the each negative difference value time subintervals, so as to obtain the second average difference value; and overlaying the second average difference value on the second average bit rate of each negative difference value time subinterval.

The second adjustment subunit further includes a second difference value allocation unit, configured to calculate the difference value ratio of the difference value of each negative difference value time subinterval to the total difference value of all the negative difference value time subintervals, and multiply the total saved bit rate value in the storage by the difference value ratio of each negative difference value time subinterval, so as to obtain the saved bit rate allocation value of each negative difference value time subinterval; and the second adjustment subunit respectively overlays each saved bit rate allocation value on the second average bit rate of its corresponding time subinterval.

The first bit rate value is the predetermined target average bit rate, which is a fixed value in each periodical time interval; and the second bit rate value is the predetermined upper limit value of bit rate.

The device further includes a bandwidth detecting unit, configured to, when the transmission bandwidth constraint is not detected, stop the coder from coding by using the second quantization parameter.

As mentioned above, the video bit rate control method can realize long-time (for example, 24 hours) bit rate control, and can guarantee the stability of video quality to the greatest extent.

DETAILED DESCRIPTION OF THE EMBODIMENTS

Figure 1:
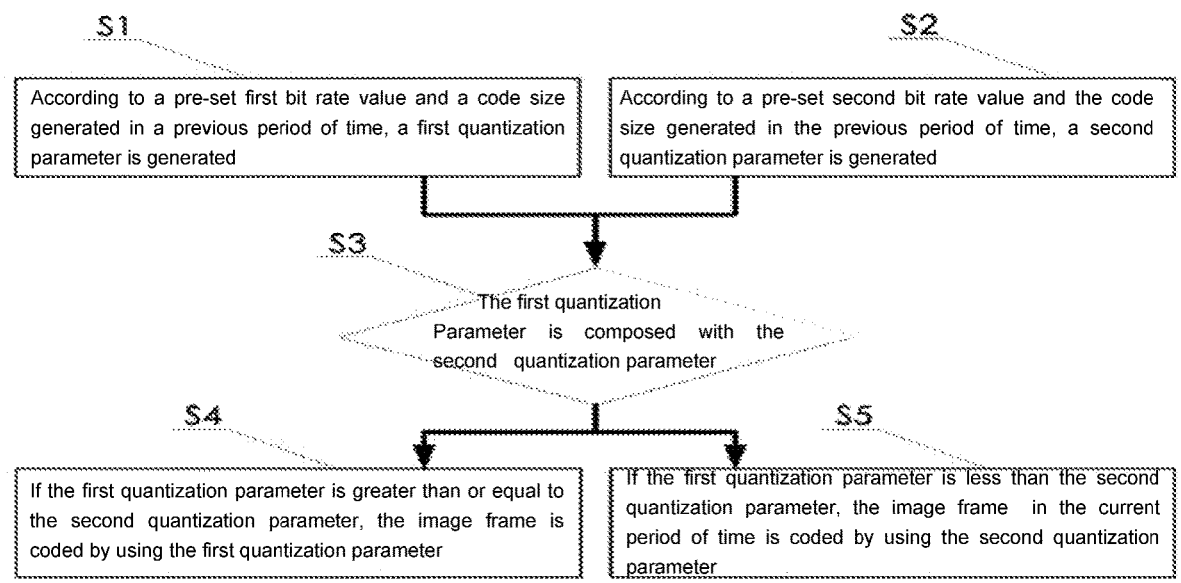
FIG. 1 is a flowchart of a video bit rate control method of the disclosure.

For making the aim, the technical solutions and the advantages of the disclosure more clear, the disclosure is further elaborated below in combination with the accompanying drawings and specific embodiments. It should be understood that these descriptions are only exemplarily and not intended to limit the scope of the disclosure. In addition, the description of the known structure and technology is omitted in the following elaboration, so as to avoid unnecessary confusion of the concept of the disclosure.

Note that, the CBR is a term for describing the quality of communication service, which means a video coding bit stream is always approximate to a target bit rate in a coding process. For video coding, CBR coding means that an output bit rate per second of a coder (or an input bit rate of a decoder) should be a fixed value (constant). Generally, the coder detects the complexity of each frame, and then calculates the bit rate. If the bit rate is too low, then useless data is filled to make the bit rate consistent with a specified bit rate; if the bit rate is too high, then the bit rate is lowered appropriately to make it consistent with the specified bit rate. So, the coding efficiency of CBR mode is low. There are more picture details in a fast moving picture, and more bits are usually required for description, but a coding method adopting CBR lowers the bit rate forcibly during coding, which causes the loss of detail information of part of the picture, so the picture of video is fuzzy and not clear. For audio compression, like MP3, the bit rate is used for showing how many bits are occupied by audio data of each second, the higher the value of the bit rate, the better the sound quality.

Whether for audio coding or video coding, the advantage of the CBR is fast compression and being capable of being supported by most software and devices; especially when multimedia communication is performed in a channel with limited bandwidth, the coding mode adopting CBR is very beneficial, because it is the highest bit rate limited at this time, the CBR can use such a channel better. However, the CBR is not suitable for storing, because the CBR cannot provide enough bit rates to code complex video contents, which causes the deterioration of quality; besides, the CBR wastes some bit rates when simple video contents are coded.

The VBR is another term for describing the quality of communication service; the VBR can change with the different complexities of video images in the coding process, so its coding efficiency is high. VBR coding means that the output bit rate of the coder (or the input bit rate of the decoder) can adjust adaptively according to the complexity of an input signal of the coder, so as to keep the output quality, but not the output bit rate, remaining unchanged. The VBR is suitable for storage, and it can use the limited storage space better, that is, more code words are used for coding a segment with high complexity, and fewer code words are used for coding a segment with low complexity.

FIG. 1 is a flowchart of a video bit rate control method of the disclosure.

As shown in FIG. 1, the video bit rate control method of the disclosure is used for controlling the bit rate of video bit streams within a periodical time interval, including the following steps.

S1: according to a pre-set first bit rate value and a code size generated in a previous period of time, a first quantization parameter is generated.

In the step, a user pre-sets the first bit rate value, and according to the first bit rate value and the code size generated in the previous period of time, generates the first quantization parameter and outputs it in real time.

In the disclosure, the first bit rate value is a predetermined target average bit rate, which is a fixed value in each periodical time interval. Specifically, the target average bit rate is the average bit rate that coding bit streams reach after a long-time adjustment, namely the average bit rate after long-time statistics; the target average bit rate can be regarded as a fixed value in each periodical time interval. The target average bit rate is decided by a video storage period and storage capacity.

S2: according to a pre-set second bit rate value and the code size generated in the previous period of time, a second quantization parameter is generated.

In the step, the user pre-sets the second bit rate value, and according to the second bit rate value and the code size generated in the previous period of time (corresponding to the previous period of time in S1), generates the second quantization parameter and outputs it in real time.

In the disclosure, the second bit rate value is a predetermined upper limit value of bit rate. The upper limit value of bit rate is the upper limit bit rate of instantaneous statistics of the coding bit streams. The upper limit value of bit rate corresponds to the bit rate under the limit of user transmission bandwidth.

Here, the sequence of performing S1 and S2 is not exclusive, they can be performed successively or simultaneously.

S3: the first quantization parameter is composed with the second quantization parameter.

In the step, the first quantization parameter is composed with the second quantization parameter, so as to select the bigger one to code the image frame in a current period of time.

In the disclosure, the image frame not quantized is the one not coded by using the quantization parameter.

S4: if the first quantization parameter is greater than or equal to the second quantization parameter, the image frame is coded by using the first quantization parameter.

S5: if the first quantization parameter is less than the second quantization parameter, the image frame in the current period of time is coded by using the second quantization parameter.

Specifically, according to the comparison result, the bigger quantization parameter is selected to code the image frame not quantized in the current period of time. If the first quantization parameter is greater than or equal to the second quantization parameter, the first quantization parameter is used to code the image frame; or else, the second quantization parameter is used to code the image frame.

Figures 2, 3:
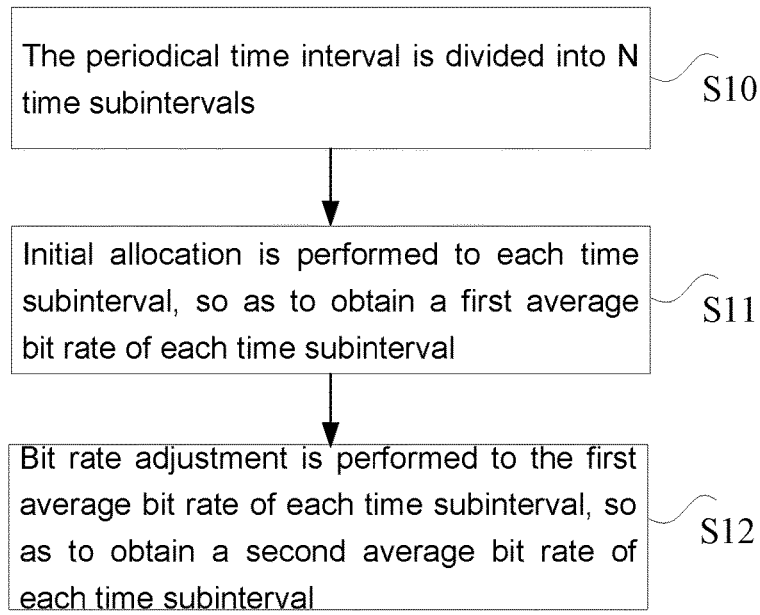
FIG. 2 is a flowchart of performing bit rate control to a first bit rate value in an embodiment of the disclosure.
FIG. 3 is a reference diagram of dividing a periodical time interval in the disclosure.

FIG. 2 is a flowchart of performing bit rate control to a first bit rate value in an embodiment of the disclosure.

As shown in FIG. 2, in an embodiment, the step of according to the pre-set first bit rate value and the code size generated in the previous period of time, generating the first quantization parameter further includes the following steps:

S10: the periodical time interval is divided into N time subintervals, wherein N is greater than 1.

In the step, before controlling the bit rate of the first bit rate value, the current time interval corresponding to the first bit rate value is first divided into at least two time subintervals. Supposing, the current time interval corresponding to the first bit rate value is 24 hours, the 24 hours can be divided into six time subintervals or eight time subintervals, and so on, referring to FIG. 3; FIG. 3 is a reference diagram of dividing a periodical time interval in the disclosure.

In the disclosure, the periodical time interval is a natural periodical time interval, such as one day and one week.

S11: initial allocation is performed to each time subinterval, so as to obtain a first average bit rate of each time subinterval, and make the first average bit rate satisfy the following formula:

$$\frac{\sum_{n=1}^{N} \text{the first average code rate of the } \textit{nth} \text{ time sub interval}}{N} =$$

the first code rate value.

In the step, initial allocation is performed to each time subinterval (namely N time subintervals), so as to obtain the first average bit rate of each time subinterval, namely the first average bit rates of N time subintervals: the first average bit rate of the first time subinterval, the first average bit rate of the second time subinterval, . . . , the first average bit rate of the Nth time subinterval, and make the first average bit rate of the N time subintervals satisfy the above formula; that is, a result obtained by dividing the sum of the first average bit rates of all the time subintervals by N is required to be equal to the first bit rate value.

S12: bit rate adjustment is performed to the first average bit rate of each time subinterval, so as to obtain a second average bit rate of each time subinterval, and make the second average bit rate satisfy the following formula:

$$\frac{\sum_{n=1}^{N} \text{the second average code rate of the } \textit{nth} \text{ time sub interval}}{N} =$$

the first code rate value.

In the step, bit rate adjustment is performed to the first average bit rate of each time subinterval (namely the first average bit rate of N time subintervals), so as to obtain the second average bit rate of each time subinterval, namely the second average bit rates of N time subintervals: the second average bit rate of the first time subinterval, the second average bit rate of the second time subinterval, . . . , the second average bit rate of the Nth time subinterval, and make the second average bit rate of the N time subintervals satisfy the above formula; that is, a result obtained by dividing the sum of the second average bit rates of all the time subintervals after adjustment by N is required to be equal to the first bit rate value too.

In the disclosure, the step of performing initial allocation to each time subinterval includes that: according to pre-set prior information, initial allocation is performed to each time subinterval; or the first average bit rate of each time subinterval is allocated to be the same as the first bit rate value. Specifically, a bit rate allocation method adopts different bit rate allocation modes because of the different phases. The initial allocation (namely initial bit rate allocation) includes that: according to the pre-set prior information, initial allocation is performed to each time subinterval; or the first average bit rate of each time subinterval is allocated to be the same as the first bit rate value.

For example, it is supposed that the first bit rate value is 48 kbps, and the periodical time interval corresponding to the first bit rate value is 24 hours. If the 24 hours are divided into six time intervals, then initial allocation is performed to the six time intervals; if initial allocation is performed according to the pre-set prior information, then the first average bit rate of the first time subinterval, . . . , the first average bit rate of the sixth time subinterval may be 6 kbps, 10 kbps, 13 kbps, 9 kbps, 7 kbps and 3 kbps, or 4 kbps, 8 kbps, 12 kbps, 12 kbps, 8 kbps and 4 kbps. If the second initial allocation mode is adopted, that is, the first bit rate value 48 kbps is equally allocated to six time subintervals, the first average bit rate of the first time subinterval, . . . , the first average bit rate of the sixth time subinterval are respectively 8, . . . , 8.

In the disclosure, the step of performing bit rate allocation to the first average bit rate of each time subinterval includes that: after the end of each time subinterval, bit rate allocation is performed according to the difference value of each time subinterval; and/or after the end of all the N time subintervals, bit rate adjustment is performed according to the difference values of all the time subintervals. Specifically, optionally, it is feasible to only perform the step of performing bit rate allocation according to the difference value of each time subinterval, or only perform the step of performing bit rate allocation according to the difference values of all the time subintervals, or performing the two bit rate allocation methods at the same time.

Figure 4:
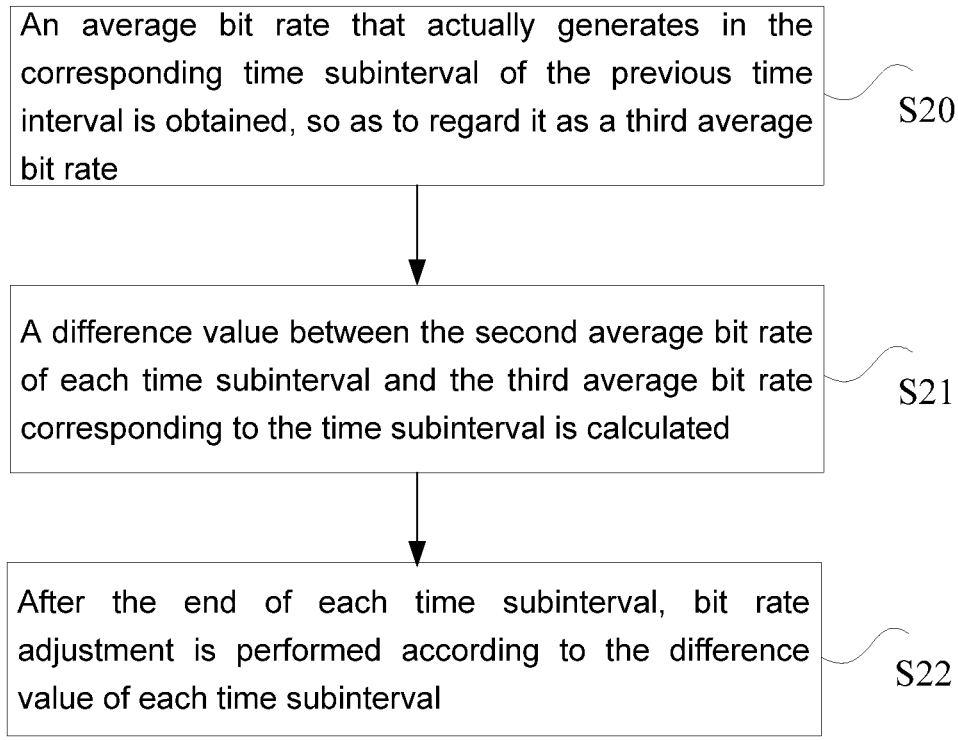
FIG. 4 is a flowchart of performing bit rate allocation according to a difference value of each time interval in an optional embodiment of the disclosure.

FIG. 4 is a flowchart of performing bit rate allocation according to a difference value of each time interval in an optional embodiment of the disclosure.

As shown in FIG. 4, in an optional embodiment, the step of performing bit rate allocation according to the difference value of each time interval further includes the following steps.

S20: an average bit rate that actually generates in the corresponding time subinterval of the previous time interval is obtained, so as to regard it as a third average bit rate.

For example, when bit rate allocation is performed to the first average bit rate after the end of the first time subinterval of the current time interval, the average bit rate that actually generates in the first time subinterval of the previous time interval is obtained, so as to regard it as the third average bit rate.

S21: a difference value between the second average bit rate of each time subinterval and the third average bit rate corresponding to the time subinterval is calculated.

Continuing from the above example, the difference value between the second average bit rate of the first time subinterval and the average bit rate that actually generates in the first time subinterval of the previous time interval is calculated.

S22: after the end of each time subinterval, bit rate adjustment is performed according to the difference value of each time subinterval.

Continuing from the above example, after the end of the first time subinterval of the current time interval, bit rate adjustment is performed according to the calculated difference value, the difference values of all the time subintervals (N time subintervals) are calculated in turn, and bit rate adjustment is performed.

Figure 5:
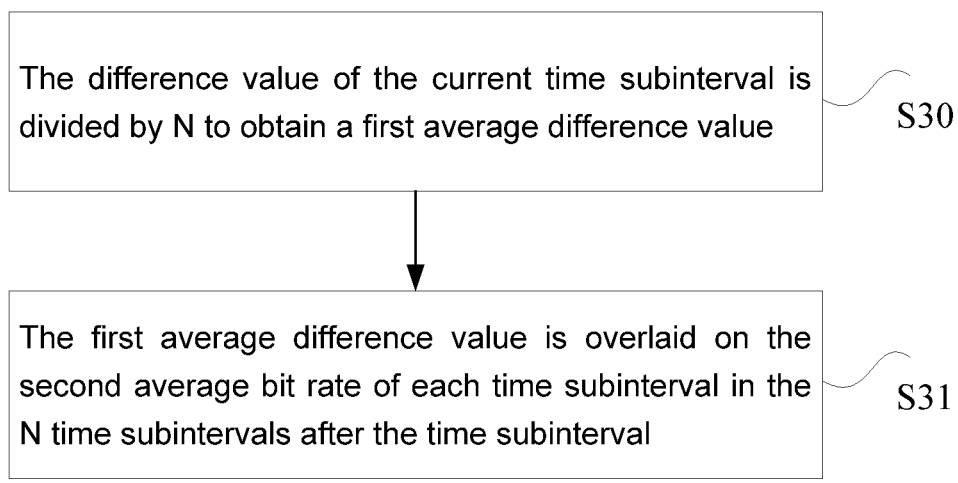
FIG. 5 is a flowchart of after the end of each time interval, performing bit rate adjustment according to a difference value of each time interval in an embodiment of the disclosure.

FIG. 5 is a flowchart of after the end of each time interval, performing bit rate adjustment according to a difference value of each time interval in an embodiment of the disclosure.

As shown in FIG. 5, in an embodiment, the step of performing bit rate adjustment according to the difference value of each time interval after the end of each time interval further includes the following steps.

S30: the difference value of the current time subinterval is divided by N to obtain a first average difference value.

Specifically, if the difference value generated in the first time subinterval is 1 kbps, the difference value 1 kbps of the first time subinterval is divided by 6 (continuing from the above example, supposing N is 6), then the first average difference value is obtained, namely 1/6. If the difference value generated in the second time subinterval is −1 kbps, then the obtained first average difference value is −1/6.

S31: the first average difference value is overlaid on the second average bit rate of each time subinterval in the N time subintervals after the time subinterval.

Continuing from the above example, the first average difference value (namely 1/6) is overlaid on the second average bit rate of each time subinterval in the N time subintervals (from the second time subinterval to the (N+1)th time subinterval) after the first time subinterval. Likewise, the first average difference value (namely −1/6) of the second time subinterval is overlaid on the second average bit rate of each time subinterval in the N time subintervals (from the third time subinterval to the (N+2)th time subinterval) after the second time subinterval. If the difference value generated in the third time subinterval is 0 kbps, there is no need to allocate the difference value.

In the embodiment, overlaying the first average difference value on the second average bit rate of each time subinterval in the N time subintervals after the time subinterval aims to even the influence of the difference value to one day to digest.

Figure 6:
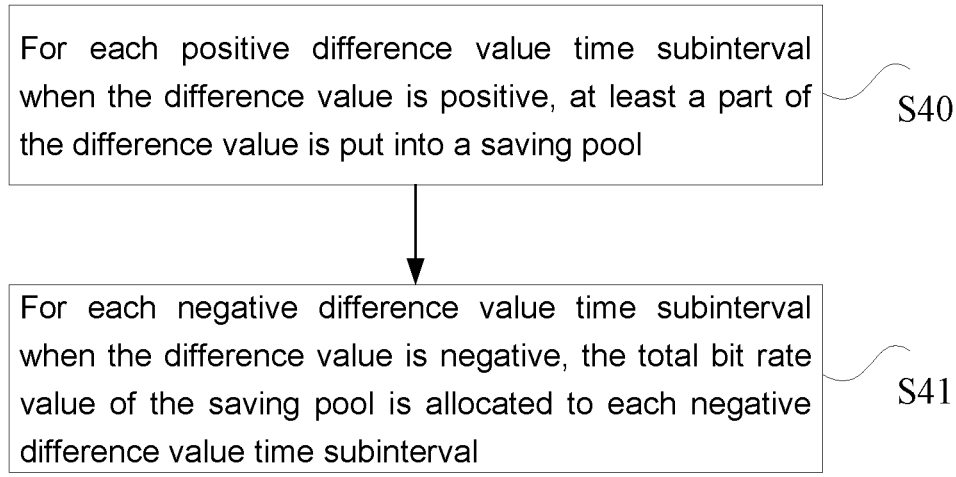
FIG. 6 is a flowchart of performing bit rate adjustment according to difference values of all time intervals in another optional embodiment of the disclosure.

FIG. 6 is a flowchart of performing bit rate adjustment according to difference values of all time intervals in another optional embodiment of the disclosure.

As shown in FIG. 6, in an optional embodiment, the step of performing bit rate adjustment according to the difference values of all the time subintervals further includes the following steps.

S40: for each positive difference value time subinterval when the difference value is positive, at least a part of the difference value is put into a saving pool.

In the step, after the end of all the N time subintervals, the difference value between the second average bit rate of the N time subintervals and the average bit rate that actually generates in the corresponding time subinterval is calculated, and for each positive difference value time subinterval when the difference value is positive, at least a part of the difference value is put into the saving pool.

In the disclosure, at least a part can be 1/2 or 2/5, or other values, the most is all of the difference value.

S41: for each negative difference value time subinterval when the difference value is negative, the total bit rate value of the saving pool is allocated to each negative difference value time subinterval.

In the step, for the negative difference value time subinterval when the difference value is negative, the total bit rate value of the saving pool is allocated to each negative difference value time subinterval in the current time interval.

Figure 7:
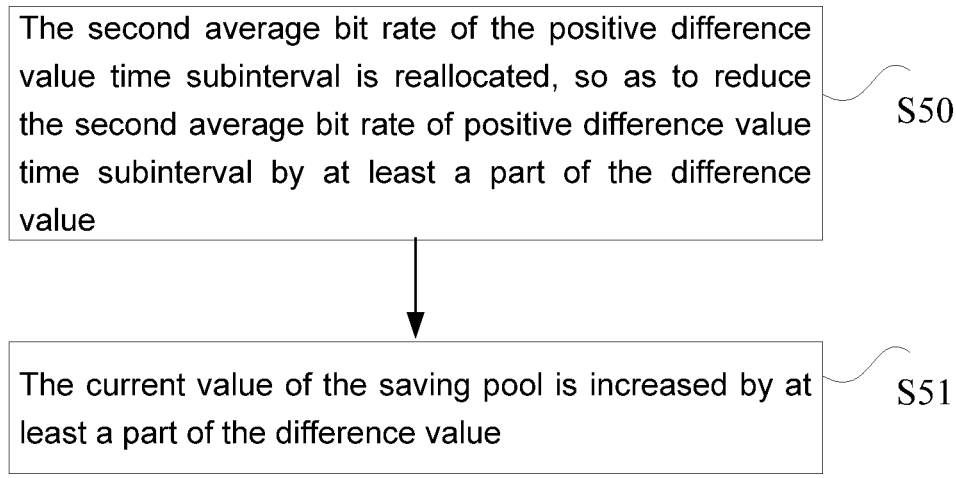
FIG. 7 is a flowchart of putting a difference value in a saving pool in an embodiment of the disclosure.

FIG. 7 is a flowchart of putting a difference value in a saving pool in an embodiment of the disclosure.

As shown in FIG. 7, in an embodiment, the step of putting at least a part of the difference value into the saving pool further includes the following steps.

S50: the second average bit rate of the positive difference value time subinterval is reallocated, so as to reduce the second average bit rate of positive difference value time subinterval by at least a part of the difference value.

Specifically, the second average bit rates of all the time subintervals are reallocated, namely at least a part of the difference value is reduced based on the second average bit rates of all the time subintervals.

S51: the current value of the saving pool is increased by at least a part of the difference value.

Specifically, the current value of the saving pool (namely the current bit rate value of the saving pool) is increased by at least a part of the difference value.

In the disclosure, the step of allocating the total bit rate value of the saving pool to each negative difference value time subinterval includes that: the total bit rate value of the saving pool is equally allocated to each negative difference value time subinterval; or according to a difference value ratio, the total bit rate value of the saving pool is allocated to each negative difference value time subinterval.

Figure 8:
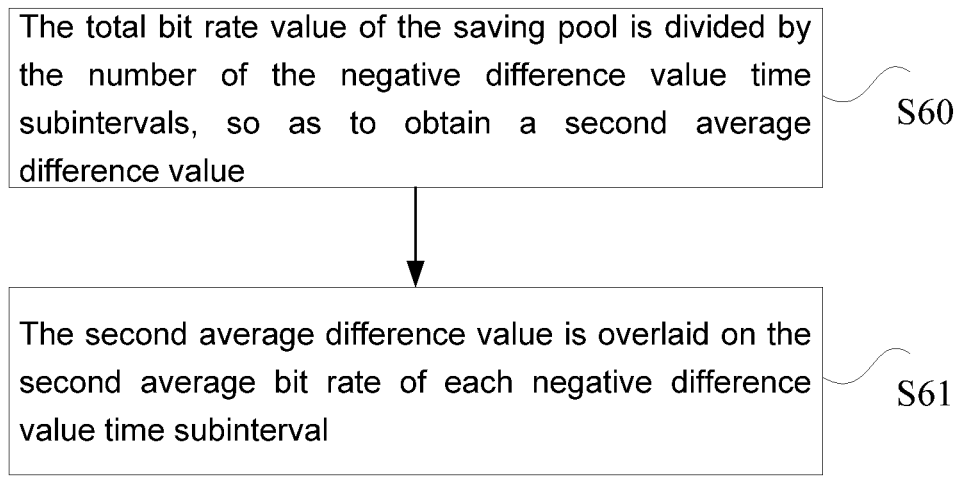
FIG. 8 is a flowchart of equally allocating the total bit rate value of the saving pool in an optional embodiment of the disclosure.

FIG. 8 is a flowchart of equally allocating the total bit rate value of the saving pool in an optional embodiment of the disclosure.

As shown in FIG. 8, in an optional embodiment, the step of equally allocating the total bit rate value of the saving pool to each negative difference value time subinterval further includes the following steps:

S60: the total bit rate value of the saving pool is divided by the number of the negative difference value time subintervals, so as to obtain a second average difference value.

S61: the second average difference value is overlaid on the second average bit rate of each negative difference value time subinterval.

Supposing the total bit rate value of the saving pool is 6, and the difference values of three negative difference value time subintervals A, B and C are −1, −2 and −3, the meaning of equally allocating is: 6 is divided by 3 to obtain the second average bit rate value 2, and 2 is overlaid on −1, −2 and −3 respectively.

Figure 9:
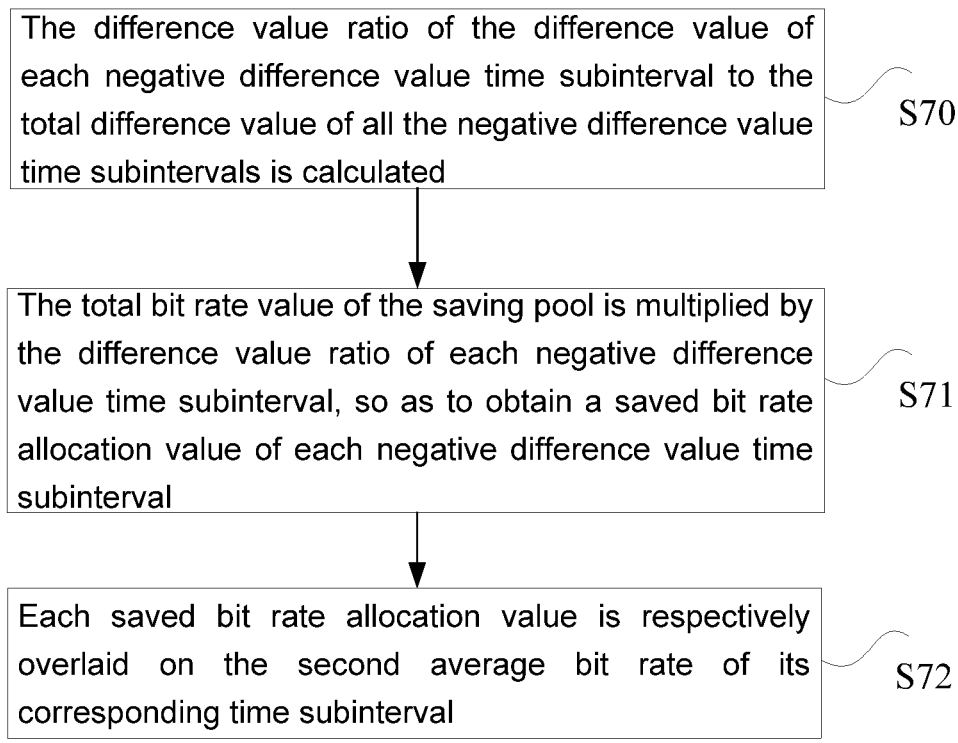
FIG. 9 is a flowchart of allocating the total bit rate value of the saving pool according to a difference value ratio in another optional embodiment of the disclosure.

FIG. 9 is a flowchart of allocating the total bit rate value of the saving pool according to a difference value ratio in another optional embodiment of the disclosure.

As shown in FIG. 9, the step of allocating the total bit rate value of the saving pool to each negative difference value time subinterval according to the difference value ratio further includes the following steps.

S70: the difference value ratio of the difference value of each negative difference value time subinterval to the total difference value of all the negative difference value time subintervals is calculated.

S71: the total bit rate value of the saving pool is multiplied by the difference value ratio of each negative difference value time subinterval, so as to obtain a saved bit rate allocation value of each negative difference value time subinterval.

S72: each saved bit rate allocation value is respectively overlaid on the second average bit rate of its corresponding time subinterval.

Supposing the total bit rate value of the saving pool is 6, and the difference values of three negative difference value time subintervals A, B and C are −1, −2 and −3, the meaning of allocating according to the difference value ratio is that: if the difference value ratios of A, B and C are 1/6, 2/6 and 3/6, the total bit rate value 6 is multiplied by the above three ratios respectively to obtain the saved bit rate allocation values 1, 2 and 3 of each time subinterval, and 1, 2 and 3 are overlaid on −1, −2 and −3 respectively.

In an optional embodiment, before the step of calculating the second quantization parameter, the method further includes that: when a transmission bandwidth constraint is not detected, performing the step of coding the image frame by using the second quantization parameter is stopped.

Specifically, before calculating the second quantization parameter, first it is detected whether the transmission bandwidth is limited; if it is not detected that the transmission bandwidth is limited, it means the transmission bandwidth is not limited, then performing the step of coding the image frame by using the second quantization parameter is stopped, and the image frame is coded by only using the first quantization parameter. If the transmission bandwidth constraint is detected, it means the transmission bandwidth is limited, then both the step of coding the image frame by using the first quantization parameter and the step of coding the image frame by using the second quantization parameter are performed.

As mentioned above, the video bit rate control method of the disclosure is elaborated; a long time (like 24 hours) is divided, initial allocation is performed to the first bit rate value (namely the target average bit rate) to obtain the first average bit rate, and bit rate adjustment is performed to the first average bit rate to obtain the second average bit rate, wherein the bit rate of each time subinterval reflects the scenario complexity of the time subinterval, so that the stability of video quality can be guaranteed to the greatest extent while the bit rate (namely the second average bit rate) of each time subinterval is approximate to the first bit rate value (namely the target average bit rate). In addition, the video bit rate control method based on the storage capacity (the bit rate control method based on the target average bit rate) and based on the transmission bandwidth (the bit rate control method based on the upper limit of bit rate) solves the problem that the existing CBR control method and the VBR control method can only select one bit rate for control, and combines them together.

Figure 10:
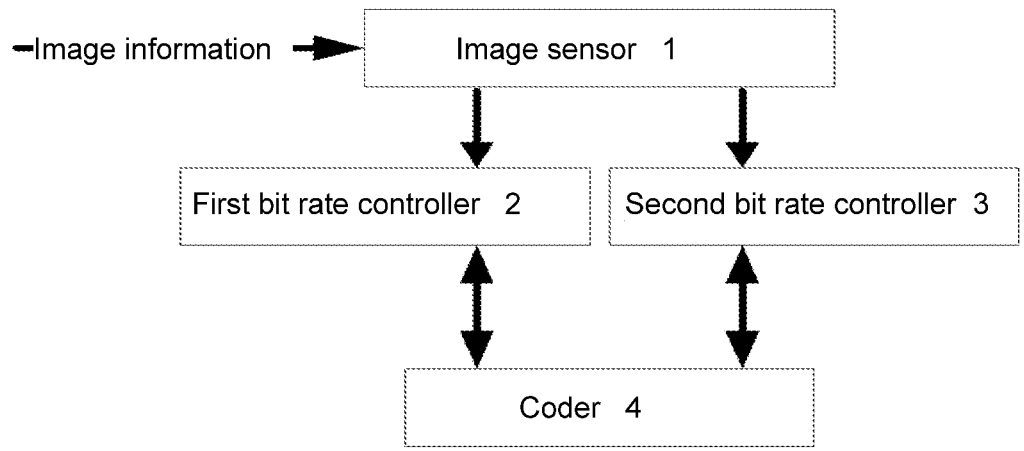
FIG. 10 is a structure diagram of a video bit rate control device of the disclosure.

FIG. 10 is a structure diagram of a video bit rate control device of the disclosure.

As shown in FIG. 10, the video bit rate control device of the disclosure is used for controlling the bit rate of video bit streams within a periodical time interval, including: an image sensor 1, a first bit rate controller 2, a second bit rate controller 3, and a coder 4.

The image sensor 1 is configured to obtain image information and generate video bit streams, and output the video bit streams to the first bit rate controller and the second bit rate controller.

The first bit rate controller 2 is connected to the image sensor 1, and configured to generate the first quantization parameter according to the pre-set first bit rate value, and output the first quantization parameter to the coder.

The second bit rate controller 3 is connected to the image sensor 1, and configured to generate the second quantization parameter according to the pre-set second bit rate value, and output the second quantization parameter to the coder.

The coder 4 is connected to the first bit rate controller 2 and the second bit rate controller 3, and configured to code the image frame of the current period of time according to the greater one in the first quantization parameter and the second quantization parameter.

In an embodiment, the first bit rate controller 2 is further configured to receive from the coder 4 the code size generated in the previous period of time, and calculate according to the first bit rate value and the code size of the previous period of time to obtain the first quantization parameter The second bit rate controller 3 is further configured to receive from the coder 4 the code size generated in the previous period of time, and calculate according to the second bit rate value and the code size of the previous period of time to obtain the second quantization parameter.

Figure 11:
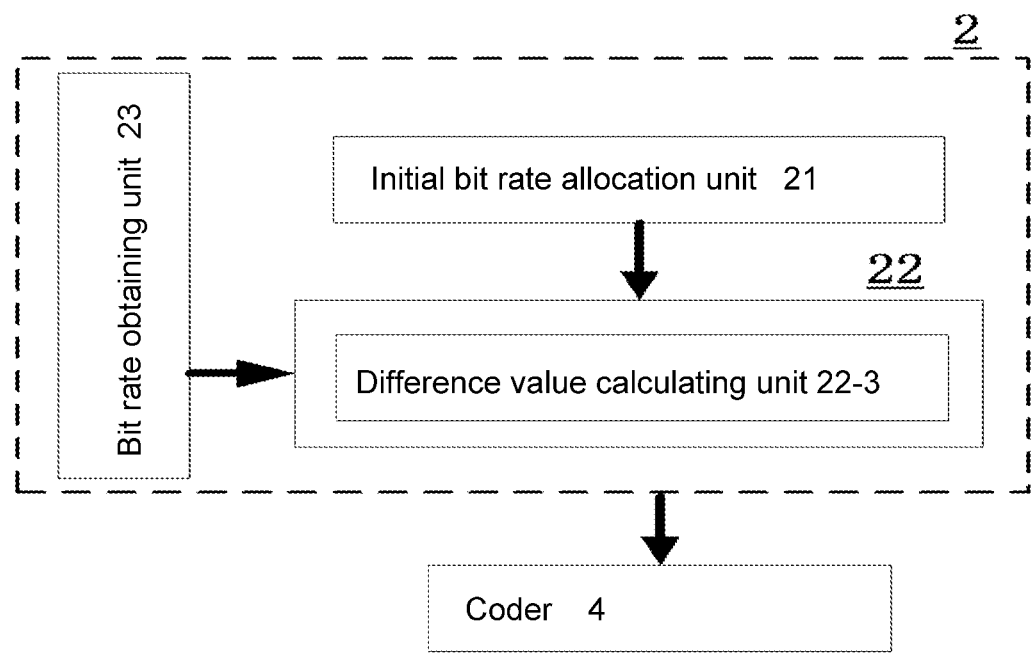
FIG. 11 is a structure diagram of a first bit rate controller of the disclosure.

FIG. 11 is a structure diagram of a first bit rate controller of the disclosure.

As shown in FIG. 11, the first bit rate controller 2 divides the periodical time interval into N time subintervals, wherein N is greater than 1; the device further includes: an initial bit rate allocation unit 21 and a bit rate adjustment unit 22.

The initial bit rate allocation unit 21 is configured to perform initial allocation to each time subinterval, so as to obtain the first average bit rate of each time subinterval, and make the first average bit rate satisfy the following formula:

$$\frac{\sum_{n=1}^{N} \text{the first average code rate of the } n\text{th time sub interval}}{N} = \text{the first code rate value.}$$

The bit rate adjustment unit 22 is connected to the initial bit rate allocation unit 21, and configured to perform bit rate adjustment to the first average bit rate of each time subinterval, so as to obtain the second average bit rate of each time subinterval, and make the second average bit rate satisfy the following formula:

$$\frac{\sum_{n=1}^{N} \text{the second average code rate of the } n\text{th time sub interval}}{N} = \text{the first code rate value.}$$

In an embodiment, the first bit rate controller 2 further includes a bit rate obtaining unit 23, which is connected to the bit rate adjustment unit 22, and configured to obtain an average bit rate that actually generates in the corresponding time subinterval of the previous time interval, so as to regard it as a third average bit rate;

the bit rate adjustment unit 22 further includes a difference value calculating unit 22-3, which is connected to the bit rate obtaining unit 23, and configured to calculate a difference value between the second average bit rate of each, time subinterval and the third average bit rate corresponding to the time subinterval.

Figure 12:
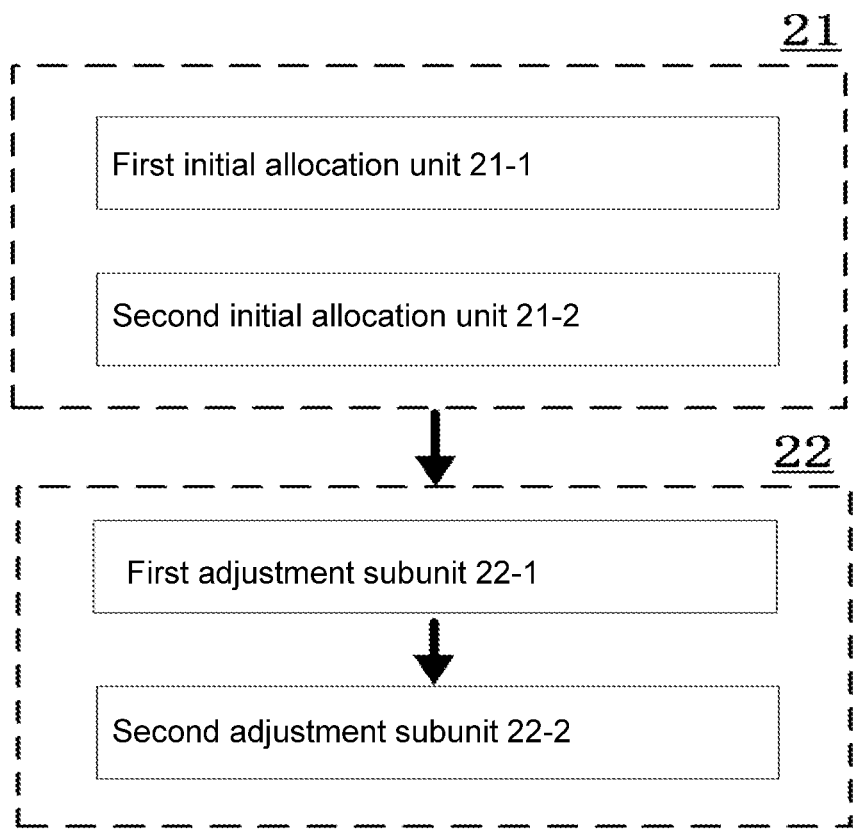
FIG. 12 is a structure diagram of an initial bit rate allocation unit and a bit rate adjustment unit of the disclosure.

FIG. 12 is a structure diagram of an initial bit rate allocation unit and a bit rate adjustment unit of the disclosure.

As shown in FIG. 12, the initial bit rate allocation unit 21 includes a first initial allocation unit 21-1 and/or a second initial allocation unit 21-2.

The first initial allocation unit 21-1 is configured to perform initial allocation to the average bit rate of each time subinterval according to the pre-set prior information.

The second initial allocation unit 21-2 is configured to allocate the first average bit rate of each time subinterval to be the same as the first bit rate value.

As shown in FIG. 12, the bit rate adjustment unit 22 includes: a first adjustment subunit 22-1 and/or a second adjustment subunit 22-2.

The first adjustment subunit 22-1 is configured to, after the end of each time subinterval, perform bit rate allocation according to the difference value of each time subinterval.

Specifically, the first adjustment subunit 22-1 performs bit rate allocation in the following way: dividing the difference value of the current time subinterval by N to obtain the first average difference value; and overlaying the first average difference value on the second average bit rate of each time subinterval in the N time subintervals after the time subinterval.

The second adjustment subunit 22-2 is configured to, after the end of all the N time subintervals, perform bit rate allocation according to the difference values of all the time subintervals.

Figure 13:
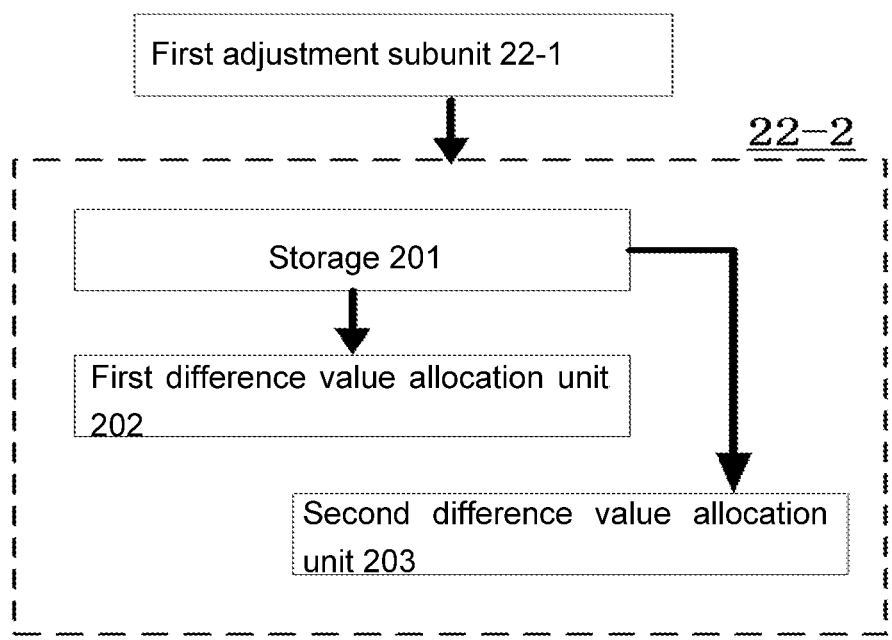
FIG. 13 is a structure diagram of a second adjustment subunit of the disclosure.

FIG. 13 is a structure diagram of a second adjustment subunit of the disclosure.

As shown in FIG. 13, the second adjustment subunit 22-2 further includes a storage 201 and a first difference value allocation unit 202.

The storage 201 is configured to store the saved bit rate value.

The first difference value allocation unit 202 is connected to the difference value calculating unit 22-3 and the storage 201, and configured to, for each positive difference value time subinterval when the difference value is positive, store at least a part of the difference value into the storage 201.

The second adjustment subunit 22-2 is configured to, for each negative difference value time subinterval when the difference value is negative, allocate the total saved bit rate value of the storage 201 to each negative difference value time subinterval.

Specifically, the second adjustment subunit 22-2 reallocates the second average bit rate of the positive difference value time subinterval, so as to reduce the second average bit rate of positive difference value time subinterval by at least a part of the difference value; and the first difference value allocation unit 202 increases the current value of the storage 201 by at least a part of the difference value.

Specifically, the second adjustment subunit 22-2 allocates the total saved bit rate value in the storage 201 to each negative difference value time subinterval in the following way: dividing the total bit rate value of the saving pool by the number of the each negative difference value time subintervals, so as to obtain the second average difference value; and overlaying the second average difference value on the second average bit rate of each negative difference value time subinterval.

Specifically, the second adjustment subunit 22-2 further includes: a second difference value allocation unit 203, configured to calculate the difference value ratio of the difference value of each negative difference value time subinterval to the total difference value of all the negative difference value time subintervals, and multiply the total saved bit rate value in the storage 201 by the difference value ratio of each negative difference value time subinterval, so as to obtain the saved bit rate allocation value of each negative difference value time subinterval; and the second adjustment subunit 22-2 respectively overlays each saved bit rate allocation value on the second average bit rate of its corresponding time subinterval.

In the disclosure, the first bit rate value is the predetermined target average bit rate, which is a fixed value in each periodical time interval; and the second bit rate value is the predetermined upper limit value of bit rate.

In the disclosure, the device further includes a bandwidth detecting unit 6, configured to, when the transmission bandwidth constraint is not detected, stop the coder 4 from coding by using the second quantization parameter.

As mentioned above, the video bit rate control method of the disclosure is elaborated; a long time (like 24 hours) is divided, initial allocation is performed to the first bit rate value (namely the target average bit rate) to obtain the first average bit rate, and bit rate adjustment is performed to the first average bit rate to obtain the second average bit rate, wherein the bit rate of each time subinterval reflects the scenario complexity of the time subinterval, so that the stability of video quality can be guaranteed to the greatest extent while the bit rate (namely the second average bit rate) of each time subinterval is approximate to the first bit rate value (namely the target average bit rate). In addition, the video bit rate control method based on the storage capacity (the bit rate control method based on the target average bit rate) and based on the transmission bandwidth (the bit rate control method based on the upper limit of bit rate) solves the problem that the existing CBR control method and the VBR control method can only select one bit rate for control, and combines them together.

As mentioned above, the disclosure provides a bit rate control method and a video coding device. The technical solution of the disclosure can realize long-time (for example, 24 hours) control of target average bit rate, and can guarantee the stability of video quality to the greatest extent.

It should be understood that the above specific embodiments are only used for exemplarily elaborating or illustrating the principle of the disclosure, but not intended to limit the disclosure. So, any modifications, equivalent replacements, improvements and the like within the spirit and scope of the disclosure shall fall within the scope of protection of the disclosure. In addition, the claims of the disclosure are intended to cover all changes and modifications falling within the scope and border of the claims, or the equivalent form of the scope and border.

What is claimed is:

1. A video bit rate control method, for controlling the bit rate of video bit streams within a periodical time interval, comprising:

according to a pre-set first bit rate value and a code size generated in a previous period of time, generating a first quantization parameter;

according to a pre-set second bit rate value and the code size generated in the previous period of time, generating a second quantization parameter;

comparing the first quantization parameter with the second quantization parameter;

if the first quantization parameter is greater than or equal to the second quantization parameter, coding an image frame in a current period of time by using the first quantization parameter; and if the first quantization parameter is less than the second quantization parameter, coding the image frame in the current period of time by using the second quantization parameter;

wherein the first bit rate value is a predetermined target average bit rate, which is a fixed value in each periodical time interval; the second bit rate value is a predetermined upper limit value of bit rate:

wherein according to the pre-set first bit rate value and the code size generated in the previous period of time, generating the first quantization parameter comprises:

dividing the periodical time interval into N time subintervals, wherein N is greater than 1;

performing initial allocation to each time subinterval, so as to obtain a first average bit rate of each time subinterval, and make the first average bit rate satisfy the following formula:

$$\frac{\sum_{n=1}^{N} \text{the first average code rate of the } nth \text{ time sub interval}}{N} =$$

the first code rate value;

performing bit rate adjustment to the first average bit rate of each time subinterval, so as to obtain a second average bit rate of each time subinterval, and make the second average bit rate satisfy the following formula:

$$\frac{\sum_{n=1}^{N} \text{the second average code rate of the } nth \text{ time sub interval}}{N} =$$

the first code rate value.

2. The method according to claim 1, wherein the step of performing initial allocation comprises:

according to pre-set prior information, performing initial allocation to the average bit rate of each time subinterval; or allocating the first average bit rate of each time subinterval to be the same as the first bit rate value.

3. The method according to claim 1, wherein the step of performing bit rate adjustment comprises:

obtaining an average bit rate that actually generates in the corresponding time subinterval of the previous time interval, so as to regard it as a third average bit rate;

calculating a difference value between the second average bit rate of each time subinterval and the third average bit rate corresponding to the time subinterval;

after the end of each time subinterval, performing bit rate adjustment according to the difference value of each time subinterval; and/or after the end of all the N time subintervals, performing bit rate adjustment according to the difference values of all the time subintervals.

4. The method according to claim 3, wherein the step of performing bit rate adjustment according to the difference value of each time subinterval after the end of each time subinterval comprises:
dividing the difference value of the current time subinterval by N to obtain a first average difference value; and
overlaying the first average difference value on the second average bit rate of each time subinterval in the N time subintervals after the time subinterval.

5. The method according to claim 3, wherein the step of performing bit rate allocation according to the difference values of all the time subintervals after the end of all the N time subintervals comprises:
for each positive difference value time subinterval when the difference value is positive, putting at least a part of the difference value into a saving pool;
for each negative difference value time subinterval when the difference value is negative, allocating the total bit rate value of the saving pool to each negative difference value time subinterval.

6. The method according to claim 5, wherein the step of putting at least a part of the difference value into the saving pool comprises:
reallocating the second average bit rate of the positive difference value time subinterval, so as to reduce the second average bit rate of positive difference value time subinterval by at least a part of the difference value; and
increasing the current value of the saving pool by at least a part of the difference value.

7. The method according to claim 5, wherein the step of allocating the total bit rate value of the saving pool to each negative difference value time subinterval comprises:
equally allocating the total bit rate value of the saving pool to each negative difference value time subinterval; or
according to a difference value ratio, allocating the total bit rate value of the saving pool to each negative difference value time subinterval.

8. The method according to claim 7, wherein the step of equally allocating the total bit rate value of the saving pool to each negative difference value time subinterval comprises:
dividing the total bit rate value of the saving pool by the number of the negative difference value time subintervals, so as to obtain a second average difference value; and
overlaying the second average difference value on the second average bit rate of each negative difference value time subinterval.

9. The method according to claim 7, wherein the step of allocating the total bit rate value of the saving pool to each negative difference value time subinterval according to the difference value ratio comprises:
calculating the difference value ratio of the difference value of each negative difference value time subinterval to the total difference value of all the negative difference value time subintervals;
multiplying the total bit rate value of the saving pool by the difference value ratio of each negative difference value time subinterval, so as to obtain a saved bit rate allocation value of each negative difference value time subinterval; and
respectively overlaying each saved bit rate allocation value on the second average bit rate of its corresponding time subinterval.

10. The method according to claim 1, wherein before the step of calculating the second quantization parameter, further comprising:
when a transmission bandwidth constraint is not detected, stopping performing the step of coding the image frame by using the second quantization parameter.

11. A video coding device, for controlling the bit rate of video bit streams within a periodical time interval to perform video coding, comprising:
an image sensor (1), configured to obtain image information and generate video bit streams, and output the video bit streams to a first bit rate controller and a second bit rate controller;
the first bit rate controller (2), configured to generate a first quantization parameter according to a pre-set first bit rate value, and output the first quantization parameter to an coder;
the second bit rate controller (3), configured to generate a second quantization parameter according to a pre-set second bit rate value, and output the second quantization parameter to the coder; and
the coder (4), configured to code an image frame of a current period of time according to the greater one in the first quantization parameter and the second quantization parameter;
wherein the first bit rate value is a predetermined target average bit rate, which is a fixed value in each periodical time interval; the second bit rate value is a predetermined upper limit value of bit rate:
wherein the first bit rate controller (2) divides the periodical time interval into N time subintervals, wherein N is greater than 1; the device further comprises:
an initial bit rate allocation unit (21), configured to perform initial allocation to each time subinterval, so as to obtain a first average bit rate of each time subinterval, and make the first average bit rate satisfy the following formula:

$$\frac{\sum_{n=1}^{N} \text{the first average code rate of the } n\text{th time sub interval}}{N} =$$

the first code rate value;

and
a bit rate adjustment unit (22), configured to perform bit rate adjustment to the first average bit rate of each time subinterval, so as to obtain a second average bit rate of each time subinterval, and make the second average bit rate satisfy the following formula:

$$\frac{\sum_{n=1}^{N} \text{the second average code rate of the } n\text{th time sub interval}}{N} =$$

the first code rate value.

12. The device according to claim 11, wherein,
the first bit rate controller (2) is further configured to receive from the coder (4) a code size generated in a previous period of time, and calculate according to the first bit rate value and the code size of the previous period of time to obtain the first quantization parameter;

the second bit rate controller (3) is further configured to receive from the coder (4) the code size generated in the previous period of time, and calculate according to the second bit rate value and the code size of the previous period of time to obtain the second quantization parameter.

13. The device according to claim 11, wherein the initial bit rate allocation unit (21) comprises:

a first initial allocation unit (21-1), configured to perform initial allocation to the average bit rate of each time subinterval according to pre-set prior information; and/or a second initial allocation unit (21-2), configured to allocate the first average bit rate of each time subinterval to be the same as the first bit rate value.

14. The device according to claim 11, wherein, the first bit rate controller (2) further comprises a bit rate obtaining unit (23), configured to obtain an average bit rate that actually generates in the corresponding time subinterval of the previous time interval, so as to regard it as a third average bit rate;

the bit rate adjustment unit (22) further comprises a difference value calculating unit (22-3), configured to calculate a difference value between the second average bit rate of each time subinterval and the third average bit rate corresponding to the time subinterval.

15. The device according to claim 14, wherein the bit rate adjustment unit (22) comprises:

a first adjustment subunit (22-1), configured to, after the end of each time subinterval, perform bit rate allocation according to the difference value of each time subinterval; and/or a second adjustment subunit (22-2), configured to, after the end of all the N time subintervals, perform bit rate allocation according to the difference values of all the time subintervals.

16. The device according to claim 15, wherein the first adjustment subunit (22-1) performs bit rate allocation in the following way:

dividing the difference value of the current time subinterval by N to obtain a first average difference value; and overlaying the first average difference value on the second average bit rate of each time subinterval in the N time subintervals after the time subinterval;

the second adjustment subunit (22-2) further comprises:

a storage (201), configured to store the saved bit rate value;

a first difference value allocation unit (202), configured to, for each positive difference value time subinterval when the difference value is positive, store at least a part of the difference value into the storage (201); and a second adjustment subunit (22-2), configured to, for each negative difference value time subinterval when the difference value is negative, allocate the total saved bit rate value of the storage (201) to each negative difference value time subinterval.

17. The device according to claim 16, wherein, the second adjustment subunit (22-2) reallocates the second average bit rate of the positive difference value time subinterval, so as to reduce the second average bit rate of positive difference value time subinterval by at least a part of the difference value; and the first difference value allocation unit (202) increases the current value of the storage (201) by at least a part of the difference value;

the second adjustment subunit (22-2) allocates the total saved bit rate value in the storage (201) to each negative difference value time subinterval in the following way:

dividing the total bit rate value of a saving pool by the number of the each negative difference value time subintervals, so as to obtain a second average difference value; and overlaying the second average difference value on the second average bit rate of each negative difference value time subinterval.

18. The device according to claim 16, wherein, the second adjustment subunit (22-2) further comprises a second difference value allocation unit (203), configured to calculate a difference value ratio of the difference value of each negative difference value time subinterval to the total difference value of all the negative difference value time subintervals, and multiply the total saved bit rate value in the storage (201) by the difference value ratio of each negative difference value time subinterval, so as to obtain a saved bit rate allocation value of each negative difference value time subinterval; and the second adjustment subunit (22-2) respectively overlays each saved bit rate allocation value on the second average bit rate of its corresponding time subinterval.

* * * * *